(12) United States Patent
Lucas

(10) Patent No.: US 8,118,354 B2
(45) Date of Patent: Feb. 21, 2012

(54) COLLAPSIBLE UNDER-SEAT EXHAUST DUCT FOR BATTERY COMPARTMENT

(75) Inventor: Marc Jonathon Lucas, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 12/778,357

(22) Filed: May 12, 2010

(65) Prior Publication Data

US 2011/0278874 A1  Nov. 17, 2011

(51) Int. Cl.
*B60N 2/04* (2006.01)
*B60N 2/56* (2006.01)

(52) U.S. Cl. .............. 296/208; 296/65.05; 296/65.09; 297/180.1; 297/15

(58) Field of Classification Search ............ 296/208, 296/63, 65.05, 65.09, 69, 65.16; 454/115, 454/120, 69; 180/65.1, 65.21, 68.5; 297/180.1, 297/15; 361/690; 62/259.2
See application file for complete search history.

(56) References Cited

U.S. PATENT DOCUMENTS

| | | | |
|---|---|---|---|
| 2,989,854 A * | 6/1961 | Gould ............................ | 62/243 |
| 5,566,880 A | 10/1996 | Khelifa et al. | |
| 5,937,664 A * | 8/1999 | Matsuno et al. ............... | 62/259.2 |
| 6,341,814 B1 * | 1/2002 | Honninger et al. ............ | 296/208 |
| 6,383,599 B1 * | 5/2002 | Bell et al. ........................ | 428/95 |
| 6,409,591 B1 | 6/2002 | Sullivan et al. | |
| 6,662,891 B2 * | 12/2003 | Misu et al. .................... | 180/68.1 |
| 6,899,366 B2 * | 5/2005 | Krueger et al. ............... | 296/37.8 |
| 6,899,381 B1 * | 5/2005 | Fero et al. ..................... | 296/214 |
| 6,902,020 B2 * | 6/2005 | Kronner et al. ............... | 180/68.5 |
| 7,048,321 B2 | 5/2006 | Bandoh et al. | |
| 7,079,379 B2 * | 7/2006 | Yamaguchi et al. ........... | 361/676 |
| 7,396,075 B2 * | 7/2008 | Ohkuma et al. ............. | 297/180.1 |
| 7,419,209 B1 * | 9/2008 | Mangiapane et al. ......... | 296/208 |
| 7,451,608 B2 | 11/2008 | Kikuchi | |
| 7,484,794 B2 * | 2/2009 | Loup et al. .................... | 296/208 |
| 7,625,039 B2 * | 12/2009 | Mangiapane et al. ......... | 296/208 |
| 7,688,582 B2 * | 3/2010 | Fukazu et al. ................. | 361/690 |
| 7,823,672 B2 * | 11/2010 | Watanabe et al. ............ | 180/68.5 |
| 2005/0011692 A1 * | 1/2005 | Takahashi et al. ............ | 180/68.5 |
| 2008/0139102 A1 | 6/2008 | Major | |
| 2008/0297136 A1 * | 12/2008 | Gaboury et al. ............ | 324/76.11 |

FOREIGN PATENT DOCUMENTS

| | | |
|---|---|---|
| EP | 1935699 A1 | 6/2008 |
| JP | 2000245015 A | 9/2000 |
| JP | 2008043098 A | 2/2008 |

OTHER PUBLICATIONS

Applicants' Statement of Relevance in Accordance With 37 C.F.R. 1.98(a)(3)(i) for IDS Reference JP 2008043098A.

* cited by examiner

*Primary Examiner* — Glenn Dayoan
*Assistant Examiner* — Gregory Blankenship
(74) *Attorney, Agent, or Firm* — David B. Kelley; Brooks Kushman P.C.

(57) ABSTRACT

A collapsible exhaust air duct for an automotive vehicle having a reconfigurable seat and an electric compartment rearward of the seat that contains heat-producing electric components. The collapsible exhaust duct is in fluid communication with the electric compartment to carry exhaust air therefrom. The duct extends forwardly beneath the seat, maintains an expanded condition when the seat is in a seating position, and is converted to a collapsed condition by movement of the seat to a stowed position. The disclosed apparatus provides a duct that maximizes usable space and flexibility in a vehicle having reconfigurable seating.

19 Claims, 4 Drawing Sheets

COLLAPSIBLE UNDER-SEAT EXHAUST DUCT FOR BATTERY COMPARTMENT

BACKGROUND

1. Technical Field

The present invention relates to automotive vehicles having air-cooled electric equipment compartments located behind a fold-down seating row.

2. Background Art

Current electric-powered vehicles (including battery electric and hybrid electric) utilize a variety of heat-producing electric components (such as batteries, battery chargers, voltage converters, and inverters). It is common to house such components in an electric compartment located within or adjacent to the vehicle passenger or cargo cabin. Such electric components typically require some amount of active cooling, which may be achieved by providing a relatively constant flow of air to the electric compartment from within the vehicle cabin and/or the exterior of the vehicle. The exhaust air from the electric compartment may be exhausted out of the vehicle through extractors and/or returned to the cabin through an exhaust air duct.

One conventional location for an electric equipment compartment is immediately behind and/or partially beneath a seating row. It is known to route the exhaust air from such a rear-mounted electric compartment through an exhaust air duct extending forwardly beneath the seating row.

Many automotive vehicles have convertible or reconfigurable interiors to maximize usable cargo volume and/or flexibility of accommodation. For example, it is common for one or more of the seats in the cabin to be movable between a generally upright, seating position and a stowed position wherein the seat back is generally parallel with and/or flush with a cargo floor. In some such convertible seating arrangements, the presence of an exhaust air duct beneath the seat conflicts with the desire to make the seat lay as low and flat as possible when in the stowed position.

SUMMARY

In a disclosed embodiment, apparatus for an automotive vehicle having a seat movable between a seating position and a stowed position and an electric equipment compartment rearward of the seat comprises a collapsible duct in communication with the electric compartment to carry exhaust air therefrom. The duct extends forwardly beneath the seat, maintains an expanded condition when the seat is in the seating position, and is converted to a collapsed condition by movement of the seat to the stowed position. The disclosed apparatus provides a duct that maximizes usable space and flexibility in a vehicle having reconfigurable seating.

In another disclosed embodiment, apparatus for an automotive vehicle having an electric compartment adjacent to a passenger cabin comprises a seat located forward of the electric compartment and movable between a seating position and a stowed position, and a collapsible exhaust air duct extending forwardly from the electric compartment and beneath the seat. The collapsible duct is movable between an expanded condition when the seat is in the seating position and a collapsed condition when the seat is in the stowed position.

In another disclosed embodiment, an automotive vehicle comprises a seat in a passenger cabin of the vehicle that is movable between a seating position and a stowed position, an electrical component, and an exhaust air duct extending from the electrical component compartment. The air duct includes a collapsible portion beneath the seat that is convertible between an expanded condition when the seat is in the seating condition and a collapsed condition when the seat is in the stowed condition.

BRIEF DESCRIPTION OF THE DRAWINGS

Embodiments of the present invention will now be described by way of example only with reference to the accompanying drawings which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
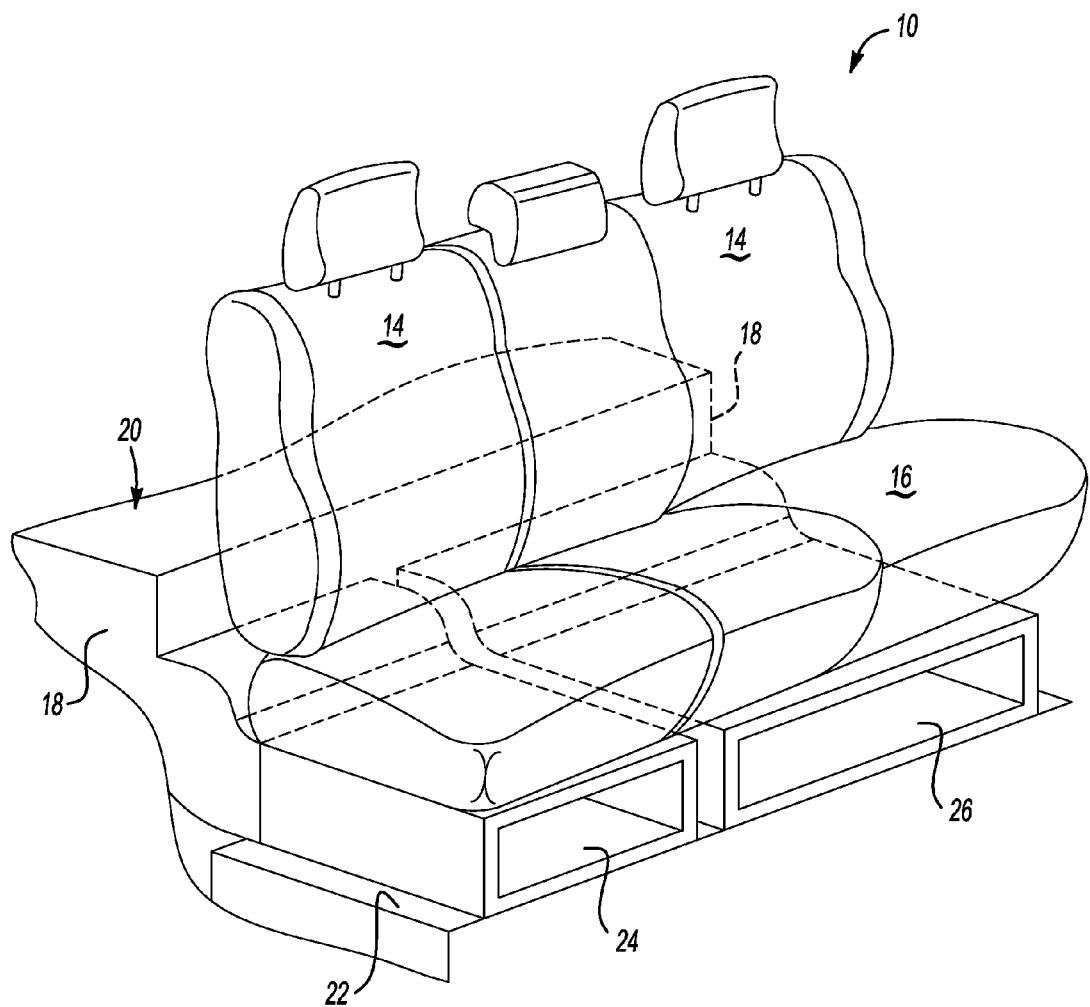
FIG. 1 is a simplified schematic diagram of a vehicle interior including a fold-down seating row.
Figure 2:
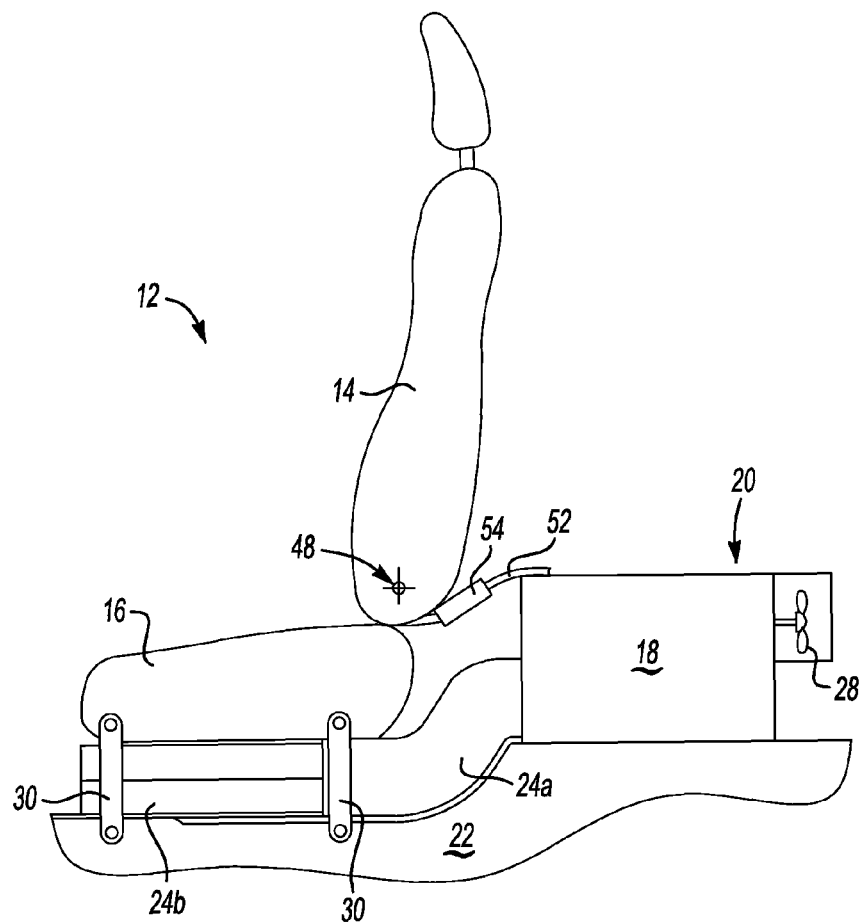
FIG. 2 is a simplified side view of the seating row of FIG. 1 in a seating position.

Referring to FIGS. 1 and 2, an automotive vehicle 10 has an interior cabin (for housing passengers and/or cargo) that contains a seating row 12. Seating row 12 comprises a generally upright seat back 14 and a generally horizontal seat bottom 16. An electrical equipment compartment 18 is located behind seating row 12 and contains electric and/or electronic components that require cooling. Examples of electric/electronic components may include, but are not limited to, batteries, battery chargers, DC/DC, AC/DC or DC/AC converters, and inverters. Electric compartment 18 is shown located immediately behind seating row 12 and beneath a load floor 20 of a rear cargo area, but the compartment may be partially or entirely above the load floor and/or partially beneath the seating row 12, as determined by interior layout and packaging constraints.

The seating row is depicted in FIG. 1 as a "60/40-split fold-down" seat in which the seat back and seat bottom is divided into left and right portions of unequal width and the left and right portions may be folded up/down separately or together as desired. As such, two separate exhaust air ducts 24, 26 are shown below the left and right portions of seat bottom 16. This seat configuration is intended by way of example only, as the present invention may be applied to a vehicle having a seating row with any number of seating positions and having any number of lateral portions. The rest of the description herein will discuss only left air duct 24, and it is to be understood that the description likewise applies to right air duct 26 and/or to a single air duct if the seating row is not subdivided into left and right portions.

As best seen in FIG. 2, when seating row 12 is in the passenger seating position seat bottom 16 is spaced above a vehicle floor 22 such that exhaust air duct 24 may extend between the floor and the seat bottom. Duct 24 comprises a rear, non-collapsing portion 24a and a forward, collapsible portion 24b. Non-collapsing duct 24a is in direct fluid communication with electric compartment 18 and the rearmost end of collapsible duct 24b is in fluid communication with the non-collapsing duct. The rearmost end of collapsible duct 24b may, for example, extend into and overlap with the forward end of non-collapsing duct 24. Seals (not shown) may be located between the overlapping surfaces of the two duct portions 24a, 24b if desired to prevent excessive leakage of exhaust air. A fan 24 may be located in or near electric compartment 18 to induce cooling air flow through the electric compartment and forwardly through duct portions 24a, 24b.

The term "collapsible" as used herein describes a duct that is engineered and constructed so as to be easily and repeatedly convertible between a fully expanded condition and a lower-profile condition, and back to the expanded condition an effectively unlimited number of times over the service life of the vehicle.

Seat bottom 16 is supported above floor 22 by rotating links 30 and is preferably retained in the seating position by a latch mechanism (not shown), as is well known in the automotive interiors art. To move the seat from the seating position to the stowed position, a user first releases the latch and then moves seat bottom 16 forwardly, the swing links 30 pivoting about both ends so that the seat bottom moves to the stowed position shown in FIG. 3. Seat back 14 may then be moved to the stowed position by, for example, pivoting it about an axis 48 so that it lies on top of seat bottom 16 so that the rear/upper surface of the seat back may serve as a cargo floor. The seat latch and/or folding mechanisms may be assisted by springs and/or may be power-actuated, as is also well known in the art.

Figure 3:
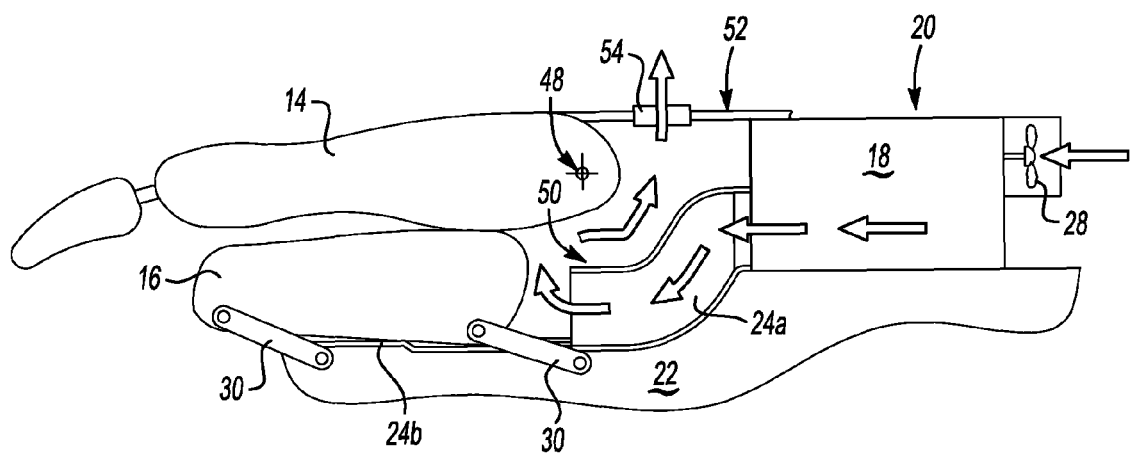
FIG. 3 is a simplified view of the seating row of FIGS. 1 and 2 in a stowed position.

Seating row 12 is of the fold-flat type movable/convertible between a seating position, shown in FIG. 2, adapted for carrying passengers and a stowed position optimized for carrying cargo, as shown in FIG. 3. It is to be understood that the present invention is applicable to any type of vehicle seat that is moveable between a seating position and a stowed position, and that the disclosed nature of the motion between seating and stowed positions as well and the mechanical components used to achieve the motion are by way of example only.

The movement of seat 12 to the stowed position shown in FIG. 3 converts collapsible duct 24b to a collapsed condition in which it has a reduced vertical height (compared with the expanded, full-height condition shown in FIG. 2) so that seat bottom 16 may be closer to the underlying vehicle structure when in the stowed position. In the collapsed condition, the embodiment of duct 24b is flattened so that little or no exhaust air from electric compartment 18 is able to flow through it. In this collapsed, reduced-height condition, exhaust air exiting non-collapsing duct 24a flows upwardly along an alternate passage 50 (as indicated by the flow arrows in FIG. 3) defined by spaces between non-collapsing duct 24a, seat back 14, and seat bottom 16. A trim panel 52 may be provided to cover any gap between seat back 14 and electric compartment 18 and/or load floor 20. Trim panel 52 may include a grill 54 that is slotted, perforated, or otherwise air-permeable to permit a relatively free passage of exhaust air upwardly therethrough.

Collapsible duct 24b may be constructed so that it naturally maintains the expanded condition and is sufficiently flexible and resilient so that application of a relatively small amount of force to its upper portion will urge it downward to the collapsed condition, and it will return to the expanded condition when downward force is released. When seat bottom 16 is moved to the stowed position, the lower portion of the seat bottom presses downwardly on the upper portion of collapsible duct 24b to force it to the collapsed condition. When seat bottom 16 is moved upwardly to the seating position, the force holding collapsible duct 24b down is released so that the duct returns or "springs" back to its expanded condition. The ability of duct 24b to maintain the necessary resiliency over the service life of the vehicle may be achieved by the use of spring-assisted inserts in the duct.

Collapsible duct 24b may be of any cross-sectional shape necessary to provide the required amount of air flow while fitting into the available packaging space. The cross-sectional shape and area of duct 24b may vary along the length of the duct. In the FIG. 4 embodiment, collapsible duct 24b is generally rectangular in cross-section when in the expanded condition and comprises an upper wall 32, a lower wall 34, and left and right side walls 36. Each of side walls 36 comprises a fold line 38 dividing the wall into an upper portion and a lower portion. Fold lines 38 are preferably located approximately half way between upper and lower walls 32, 34. Fold lines 38 allow the upper and lower portions of side walls 36 to fold relative to one another to a flat or near-flat position. As discussed above, side walls 36 may be provided with spring-assist devices (not shown) that hold the duct 24a in and/or urge it to the expanded condition.

Figure 4:
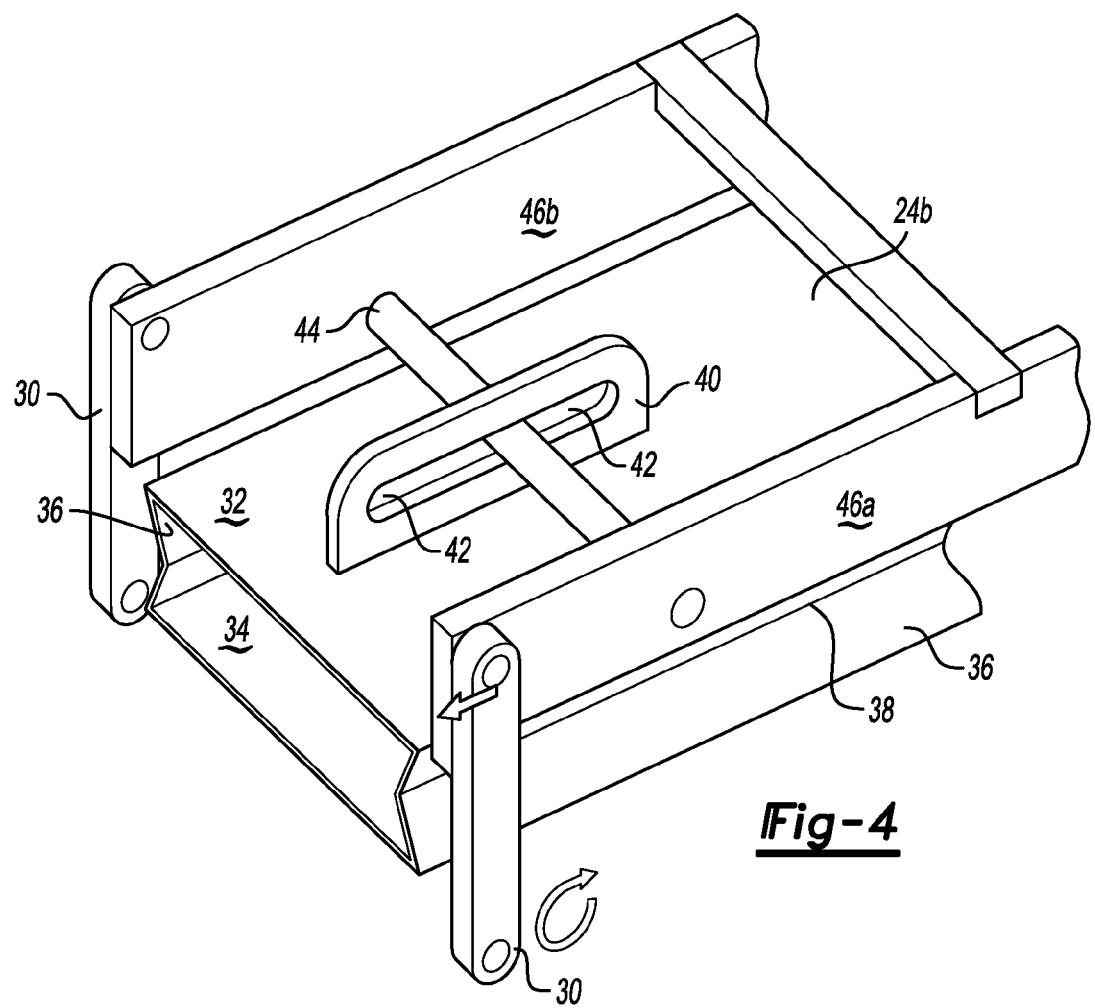
FIG. 4 is a partial view showing of a folding seat frame with a mechanism for actuating a collapsible exhaust duct.

FIG. 4 also illustrates a duct actuating mechanism. A tab 40 projects upwardly from upper wall 32 of collapsible duct 24b and a slot 42 is formed therein. A bar 44 has ends attached to left and right seat rails 46a, 46b and passes through slot 42.

As seat bottom 16 moves forward and downward from the seating position to the stowed position, bar 44 moves along slot 42 and acts as an actuating member, pressing downwardly on a follower surface provided by the interior of the slot, thereby urging the tab 40 and attached duct top surface 32 downwardly. It should be noted that slot 42 need not be straight, as shown, but may be curved, angled, or otherwise non-linear to achieve the desired motion of duct 24b relative to seat bottom 16. Fold lines 38 allow side walls 36 to deflect inwardly and collapsible duct 24b assumes the collapsed condition wherein the vertical dimension of the duct is reduced to permit seat bottom 16 to assume a lower position when stowed. In this specific embodiment, upper wall 32 is touching or closely adjacent to lower wall 34 (leaving little or no room for air flow) and seat bottom 16 is touching or closely adjacent to upper wall 32.

When seat bottom 16 is returned to the seating position, its upward and rearward motion results in bar 44 pulling upwardly against the follower surface provided by the interior of slot 42. This urges upwardly on upper duct wall 32 and so returns collapsible duct 24b to the expanded condition wherein it is in fluid communication with non-collapsing duct 24a.

Figure 5A:
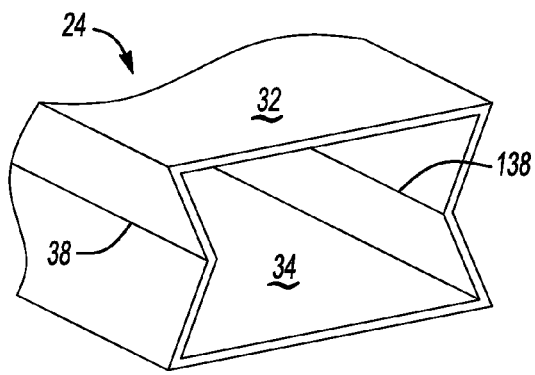
FIGS. 5a and 5b are schematic views of a first embodiment of a collapsible duct.
Figure 5B:
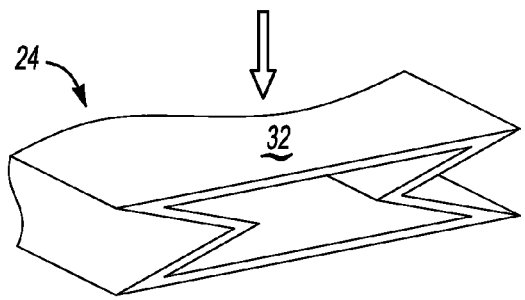

FIGS. 5a and 5b illustrate in greater detail the configuration of the collapsible duct of FIG. 4. As seen in FIG. 5b, fold lines 38 allow the side walls 36 to assume a folded-flat condition in which the upper portions lay on top the respective lower portions when in the collapsed position, so that the overall height of duct 24b is reduced to as small as possible.

Figure 6A:
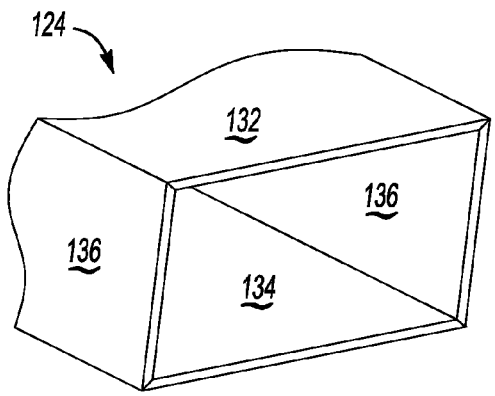
FIGS. 6a and 6b are schematic views of a second embodiment of a collapsible duct.
Figure 6B:
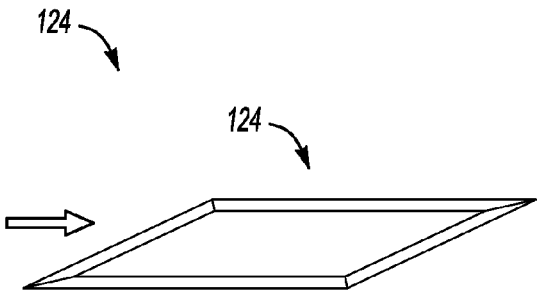

FIGS. 6a and 6b illustrate an alternative embodiment of a collapsible duct 124a comprising a top wall 132, a bottom wall 134, and left and right side walls 136. When top wall 132 is urged downwardly towards bottom wall 134, the duct maintains a parallelogram-shaped cross-section, with side walls 136 pivoting about their lower ends while remaining parallel during movement to the collapsed condition shown in FIG. 6b.

Figure 7A:
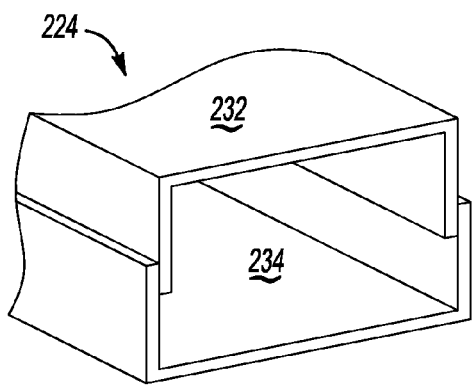
FIGS. 7a and 7b are schematic views of a third embodiment of a collapsible duct.
Figure 7B:
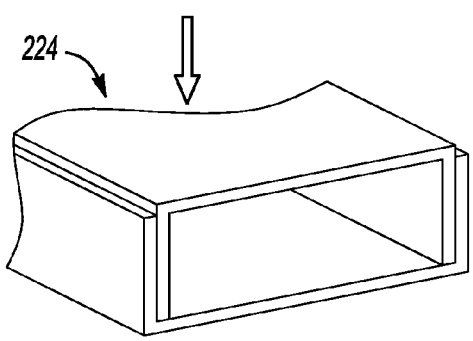

FIGS. 7a and 7b illustrate a third embodiment of a collapsible duct 224b, wherein an upper duct portion 232 and a lower duct portion 234 have respective side walls that are parallel to one another and slide past one another during movement between the expanded and collapsed positions. It should be noted that duct 224b in the collapsed condition does not have as low a profile as the other embodiments, but such a geometry may be used if permitted by vehicle interior packaging constraints.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. Apparatus for an automotive vehicle having a seat movable between a seating position and a stowed position and an electric equipment compartment rearward of the seat comprising:
   a collapsible duct in communication with the electric compartment to carry exhaust air therefrom, the duct extending forwardly beneath the seat, the duct comprising first and second laterally opposed side walls maintaining an expanded condition when the seat is in the seating position, and the side walls converted to a collapsed condition by movement of the seat to the stowed position.

2. The apparatus of claim 1 further comprising a non-collapsing duct upstream of the collapsible duct, the non-collapsing duct maintaining an expanded condition wherein it carries exhaust air when the seat is in the stowed position.

3. The apparatus of claim 1 wherein each of the side wall comprises at least two portions separated by a fold line, the two portions folding relative to one another about the fold line to assume a folded-flat condition when the duct is in the stowed position.

4. The apparatus of claim 1 wherein the collapsible duct further comprises a top wall and a bottom wall, the top wall moving laterally and downward relative to the bottom wall and the first and second side walls pivoting while remaining parallel during movement to the collapsed condition.

5. The apparatus of claim 1 wherein the collapsible duct further comprises a top portion and a bottom portion, and each side wall comprises an upper portion extending downward from the top portion and a lower portion extending upward from the bottom portion, the side wall upper portions sliding parallel to the side wall lower portions during movement between the collapsed and expanded conditions.

6. The apparatus of claim 1 wherein the collapsible duct further comprises a follower surface for engagement by an actuating member associated with the seat, engagement between the actuating member and the follower surface urging the collapsible duct to the collapsed condition.

7. Apparatus for an automotive vehicle having an electric compartment adjacent to a passenger cabin comprising:
   a seat located forward of the electric compartment and movable between a seating position and a stowed position; and
   a collapsible exhaust air duct extending forwardly from the electric compartment and beneath the seat, the collapsible duct movable between an expanded condition when the seat is in the seating position and a collapsed condition when the seat is in the stowed position, the seat engaged with the duct such that movement of the seat to the seating position pulls an upper portion of the duct upwardly to thereby move the duct to the expanded condition.

8. The apparatus of claim 7 wherein the duct further comprises a non-collapsing duct upstream of the collapsible duct, the non-collapsing duct maintaining an expanded condition when the seat is in the stowed position.

9. The apparatus of claim 7 wherein the engagement between the seat and the upper portion of the duct is achieved by an actuating member attached to the seat and engaging a follower surface associated with the upper portion of the duct.

10. The apparatus of claim 9 wherein the follower surface comprises an inner surface of a guide slot and the actuating member comprises a bar received in the guide slot.

11. The apparatus of claim 7 wherein when the seat is in the stowed position, portions of the seat define spaces providing an alternate air passage conducting the air into the passenger cabin adjacent a rear portion of the seat.

12. The apparatus of claim 7 wherein the seat comprises a seat bottom that moves downward and forward when moving from the seating position to the stowed position, and the duct is converted to the collapsed condition by the downward motion of the seat bottom.

13. The apparatus of claim 12 wherein the seat further comprises a seat back that assumes a generally horizontal orientation and at least partially overlies the seat bottom when in the stowed position.

14. An automotive vehicle comprising:
    a seat in a passenger cabin of the vehicle that is movable between a seating position and a stowed position;
    an electrical component; and
    an exhaust air duct extending from the electrical component compartment, wherein the air duct includes a collapsible portion beneath the seat, the collapsible portion comprising first and second laterally opposed side walls and being converted between an expanded condition when the seat is in the seating condition and a collapsed condition when the seat is in the stowed condition.

15. The automotive vehicle of claim 14 further comprising a non-collapsing duct upstream of the collapsible duct, the non-collapsing duct maintaining an expanded condition when the seat is in the stowed position.

16. The automotive vehicle of claim 14 wherein the seat comprises a seat bottom that moves downward and forward when moving from the seating position to the stowed position, and the duct is converted to the collapsed condition by the downward motion of the seat bottom.

17. The automotive vehicle of claim 16 wherein the seat further comprises a seat back that folds forward and at least partially overlies the seat bottom when in the stowed position.

18. The apparatus of claim 14 wherein the seat engages the duct such that movement of the seat to the seating position pulls an upper portion of the duct upwardly to thereby move the duct to the expanded condition.

19. The apparatus of claim 14 wherein the seat when in the stowed position provides an alternate air passage conducting the air into the passenger cabin adjacent a rear portion of the seat.

* * * * *